United States Patent [19]

Howlett

[11] Patent Number: 5,085,820
[45] Date of Patent: Feb. 4, 1992

[54] METHOD OF CONSTRUCTING TUBULAR SPARS

[76] Inventor: Ian C. Howlett, Chestnut Cottage, Beaulieu, Hampshire SO42 7YB, England

[21] Appl. No.: 508,144

[22] Filed: Apr. 11, 1990

[30] Foreign Application Priority Data

Apr. 12, 1989 [GB] United Kingdom ............ 8908279

[51] Int. Cl.⁵ .................. B29C 41/20; B29C 43/20
[52] U.S. Cl. ................................ 264/255; 264/257
[58] Field of Search ............ 264/257, 258, 255, 250, 264/241

[56] References Cited

U.S. PATENT DOCUMENTS 3,765,360 10/1973 Monfort ....................... 52/309.9

Primary Examiner—Jay H. Woo
Assistant Examiner—Jeremiah F. Durkin, II
Attorney, Agent, or Firm—Notaro & Michalos

[57] ABSTRACT

A method of constructing tubular spars, particularly spars for use on sailing vessels, includes the step of placing in a channel section mold, a layer or layers of fiber reinforced plastic material to form part of the periphery of the tubular spar. Side wall portions of the mold are then removed and longitudinally spaced formers are placed along the plastic part of the spar that was in the mold. A sheet-like skin is placed over the formers and is secured to the formers. A further layer or layers of fiber reinforced plastic material is then placed over the skin to form the remainder of the periphery of the molded tubular spar.

8 Claims, 1 Drawing Sheet

METHOD OF CONSTRUCTING TUBULAR SPARS

FIELD AND BACKGROUND OF THE INVENTION

The invention relates to a method of constructing tubular spars and particularly, but not exclusively, to a method of constructing tubular spars for use on sailing vessels, such as yachts, and vessels provided with auxiliary sail propulsion. The invention also relates to a tubular spar when produced by the method.

SUMMARY OF THE INVENTION

According to the present invention there is provided a method of constructing tubular spars, comprising the steps of placing in a channel section mold a layer or layers of a plastic material to form part of the periphery of the tubular spar, removing side wall portions of the mold, placing on the molded plastic material a plurality of spaced apart formers, placing over the formers a sheet-like skin, securing the skin to the formers, and then placing in contact with the skin a layer or layers of plastic material to form the remainder of the periphery of the molded tubular spar.

Preferably, the mold has a flat base in cross-section but the base can be of any other desired cross-sectional shape, such as arcuate.

The formers are preferably substantially oval in shape but they may be of any other desired shape.

The formers may be removed after the plastic material has set or hardened or they may be left in situ in the tubular member so as to serve to strengthen the tubular spar.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

The mold is indicated generally at 10 and consists of a base 11 and side walls 12 which define a channel section mold of any desired length. The side walls 12 are detachably secured to the base 11 in any desired manner, such as by screws, and the mold may be formed of wood or any other suitable material. The side walls 12 taper in width and decrease from the base 11 toward their upper end.

The mold 10 is shown as having a flat base in cross-section but the base can have any desired cross-sectional shape, such as an arcuate shape.

The method of constructing a tubular spar for use on sailing vessels or vessels provided with auxiliary sail propulsion, will now be described.

Figure 1:
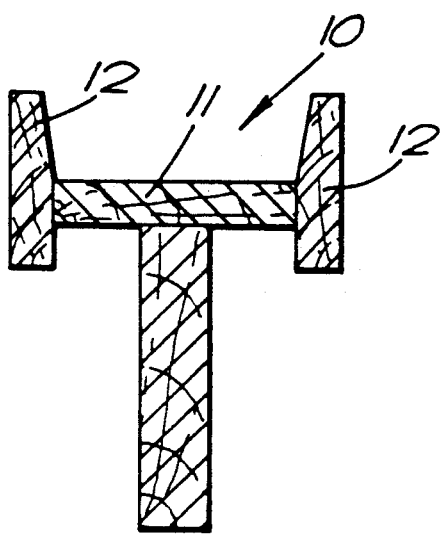
FIG. 1 is a cross-sectional view of the mold showing a step in the method of the invention.
Figure 2:
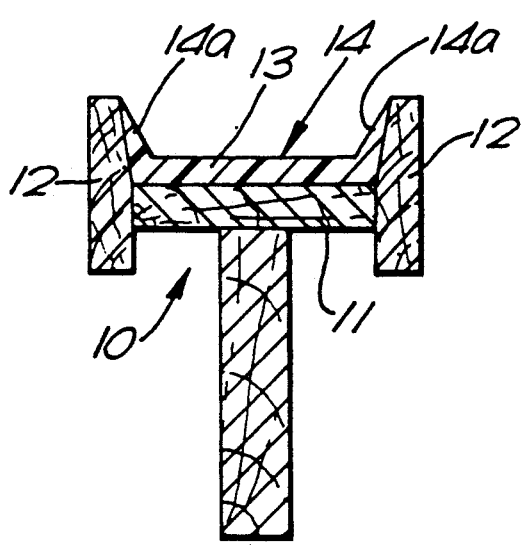
FIG. 2 is a cross-sectional view through a mold used in carrying out the method of the invention.
Figure 3:
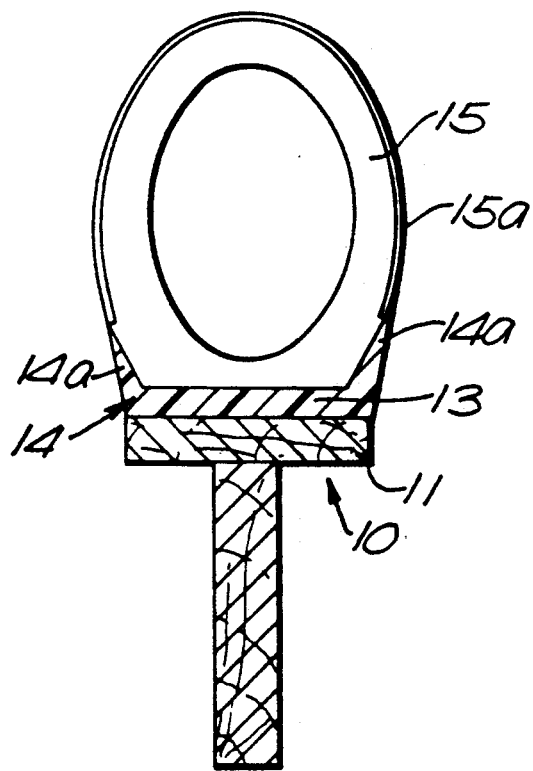
FIG. 3 is a cross-sectional view showing part of the mold removed and formers placed on the partly molded tubular member.
Figure 4:
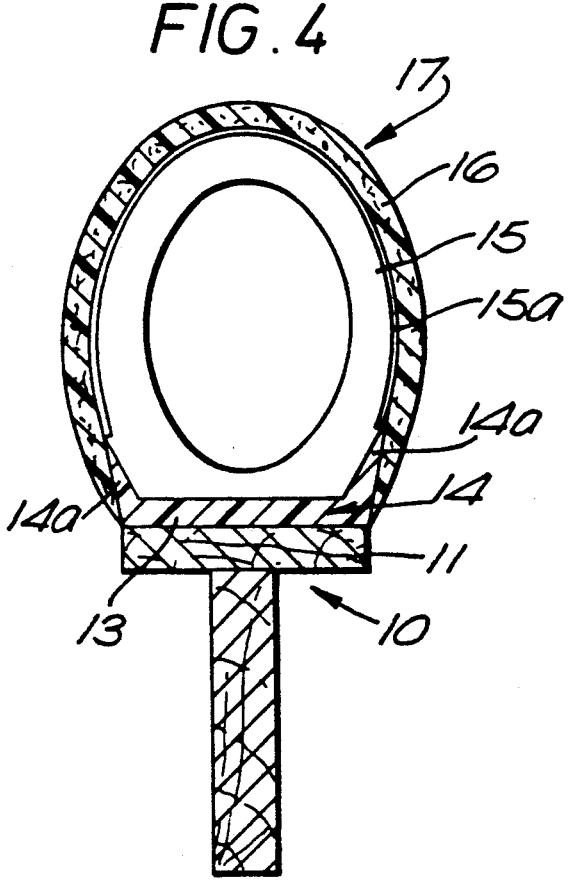
FIG. 4 is a cross-sectional view of the completely molded tubular spar still supported on the mold.

Firstly, a layer or layers of fiber reinforced plastic material 13 is placed on the mold 10 to form a part 14 which forms part of the periphery of the tubular spar. The part 14 has at each side a longitudinally extending upstanding side portion 14a which tapers upwardly. When the plastic material 13 has set or hardened the side walls 12 of the mold 10 are removed, as shown in FIG. 3, and a plurality of spaced apart formers 15 are placed in an upright position on the molded part 14.

The formers 15 are shown as having a substantially oval shape in side view, but they may have any other desired shape. The formers 15 may be spaced apart at any desired spacing and they may be formed of plywood or metal or other suitable material.

The formers 15 may be set up on the molded part 14 before the molded part 14 has set or hardened and before the side walls 12 have been removed.

The bottom portion of each former 15 fits exactly into the shape of the upper side of the molded part 14. A sheet-like skin 15a is placed in contact with the formers 15. The skin is secured thereto by bonding or other securing means.

After the formers 15 have been set up, a second layer or layers of fiber reinforced plastic material 16 is placed in contact with the skin 15a secured to the formers 15 to form the remaining remainder portion 17 of the periphery of the molded tubular member. The connection of portion 17 to the part 14 is achieved by an overlapped or lapped joint with the side portions 14a. The skin 15a supports the material 16.

After the plastic material 16 has set or hardened, the formers 15 may be removed. Alternatively, the formers 15 may be left in situ in order to strengthen the molded tubular member.

The reinforced plastic material 13, 16 may be glass or carbon or aramid fiber reinforced plastic material and the lay-up of the material may be by the wet lay method or by the pre-impregnated method using any of the commercially available resin matrix systems.

I claim:

1. A method of constructing a tubular spar, comprising:
   placing at least one first layer of plastic material in a channel section mold, the channel section mold having a base and at least one wall section extending in a longitudinal direction, to form the at least one first layer of plastic material into a first part of a periphery of a tubular spar;
   allowing the first part of the periphery of the tubular spar to at least partly harden in the channel section mold against the base and against the at least one wall section;
   thereafter removing the at least one wall section from the base of the mold;
   placing a plurality of longitudinally spaced formers against the first part of the periphery of the tubular spar;
   placing a sheet-like skin over the formers;
   securing the skin to the formers; and
   thereafter placing at least one second layer of plastic material into contact with the skin to form a second remaining part of the periphery of the tubular spar to complete the tubular spar.

2. A method according to claim 1, including allowing the first and second layers of plastic material to harden and, thereafter, removing the formers.

3. A method according to claim 1, including allowing the first and second layers of plastic material to harden and retaining the formers within the spar for strengthening the spar.

4. A method according to claim 1, wherein the first part of the periphery of the tubular spar has at least one longitudinally extending and upstanding side portion which tapers upwardly from the base and along the at least one wall section of the mold before the wall section is removed, the at least one second layer of plastic material at least partly overlapping the upstanding side portion of the first part when the at least one second layer of plastic material is placed in contact with the skin.

5. A method according to claim 1, where at least one of the first and second layers of plastic material comprises fiber reinforced plastic material.

6. A method according to claim 1, wherein the base of the mold is flat.

7. A method according to claim 1, wherein each former is at least partly arcuate.

8. A method according to claim 7, wherein each former is at least partly oval.

* * * * *